No. 736,331. Patented August 11, 1903.

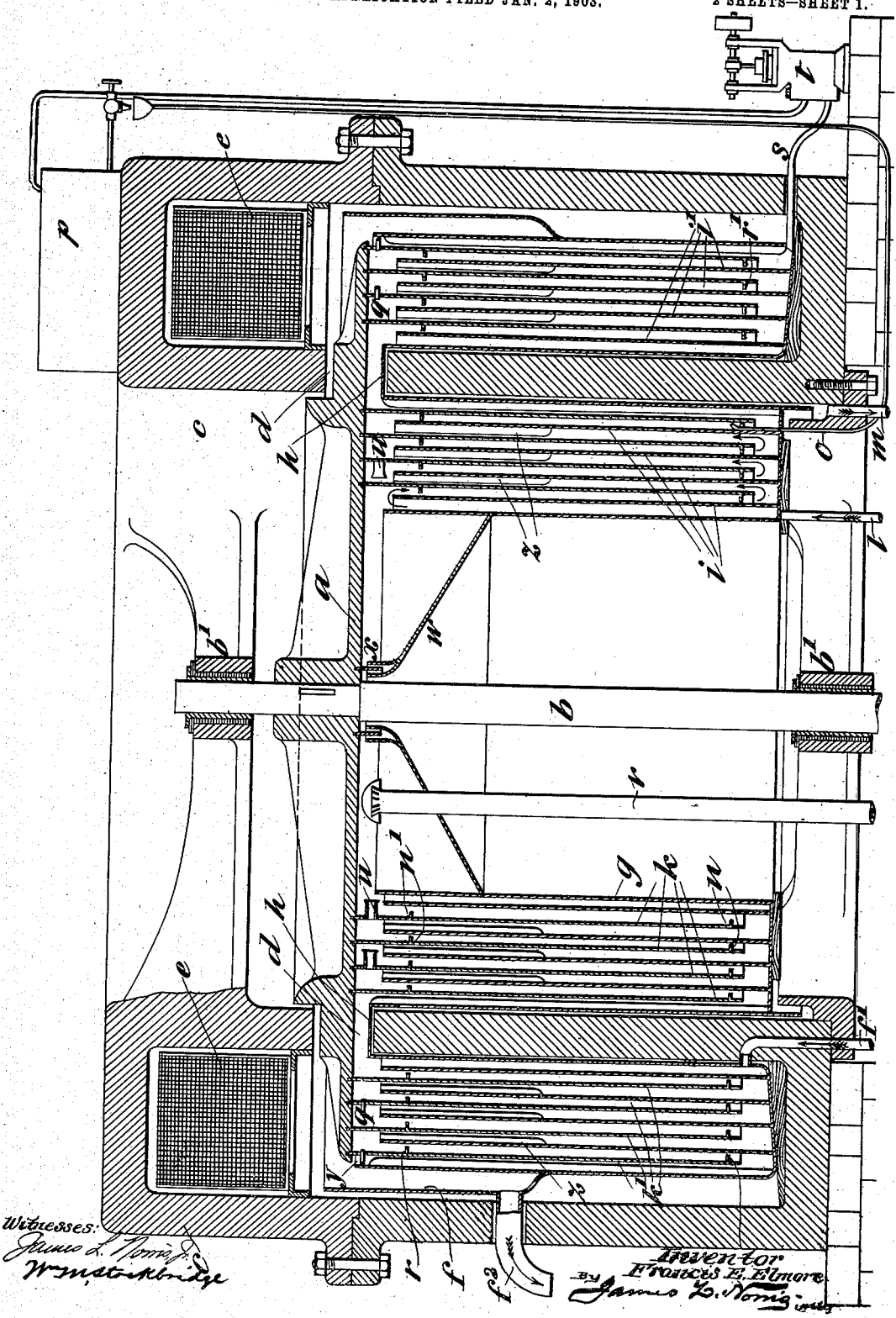

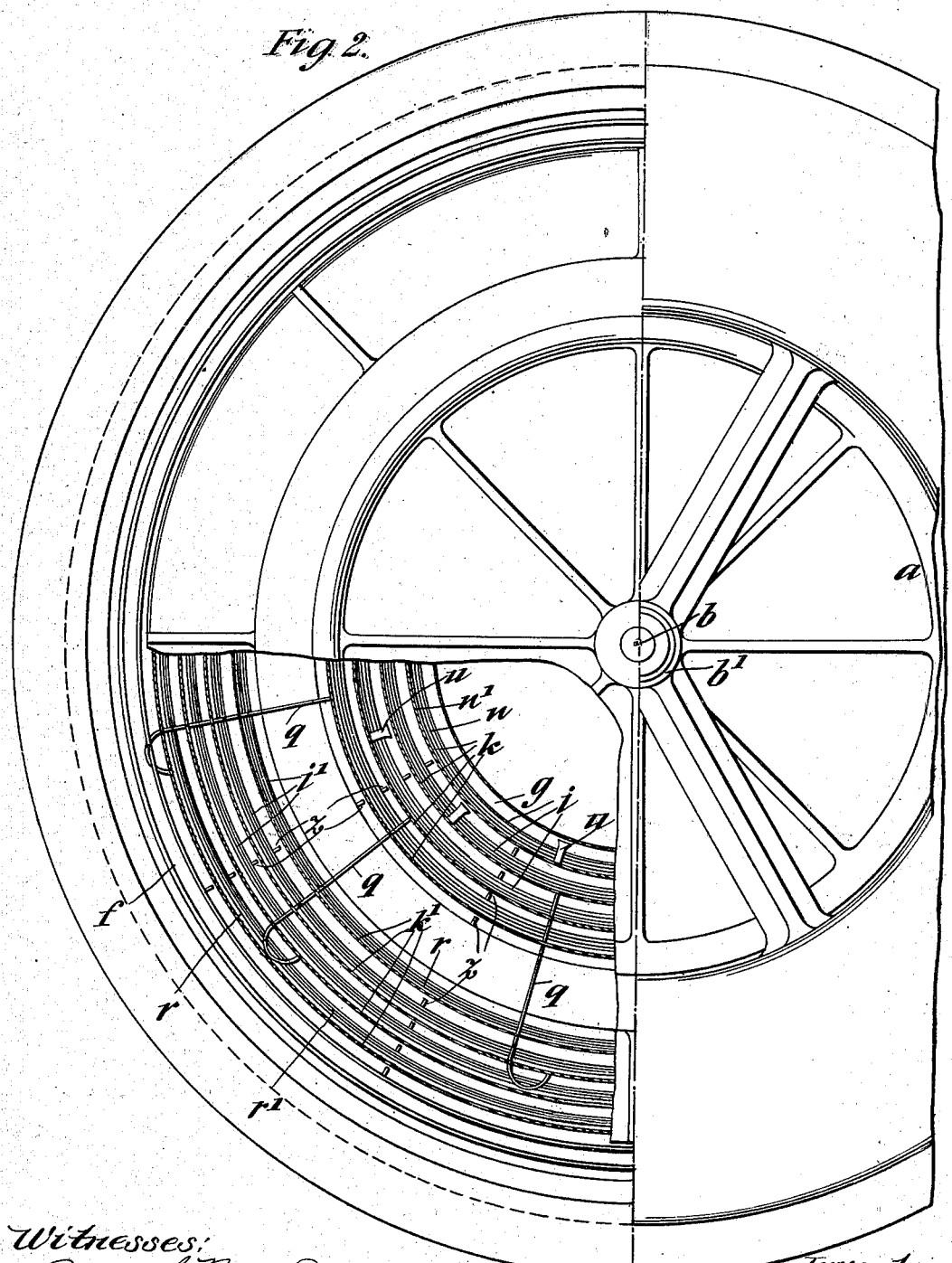

UNITED STATES PATENT OFFICE.

FRANCIS EDWARD ELMORE, OF LONDON, ENGLAND.

APPARATUS FOR THE GENERATION AND APPLICATION OF ELECTRIC CURRENTS FOR ELECTROLYSIS.

SPECIFICATION forming part of Letters Patent No. 736,331, dated August 11, 1903.

Application filed January 2, 1903. Serial No. 137,587. (No model.)

*To all whom it may concern:*

Be it known that I, FRANCIS EDWARD ELMORE, a citizen of England, residing at 4 Bishopsgate street Within, in the city of London, England, have invented certain new and useful Improvements in Apparatus for the Generation and Application of Electric Currents for Electrolysis, (for which I have applied for a patent in Great Britain, dated November 6, 1902, No. 24,330,) of which the following is a specification.

In my British specification No. 26,673 of 1901 is described a machine of the unipolar-dynamo kind for generating electric currents and directly applying them for electrolysis.

My present invention relates to improvements in this type of apparatus, whereby metallic collectors or rubbing contacts are avoided. For this purpose an electrical conductor having the electrodes at each end of it is moved in a magnetic field situated between the electrodes, the simplest arrangement being a circular conductor with electrodes concentrically arranged on it rotating in a circular field.

As an example of the kind of apparatus I construct according to my invention there is shown in Figure 1 of the accompanying drawings a vertical section, and in Fig. 2 a plan, partly in section, of a unipolar dynamo combined with annular electrolytic cells, two of which are here shown, although more than two may be used.

The armature of the dynamo is a metal disk $a$, keyed to a vertical shaft $b$, rotated in insulated bushes $b'$ by any suitable means. The magnet is an annular box $c$, constructed wholly of magnetic material and completely closed except that its inner wall is divided horizontally to form an air-gap $d$, through which the armature $a$ extends. This magnet is excited by electric current passing through coils $e$ in its upper part.

The lower part of the magnet contains an annular vessel $f$, preferably made of or lined with some metal capable of resisting the attack of the electrolyte. A similar vessel $g$, of smaller diameter, is contained in the space inclosed by the magnet, and each of these vessels constitutes an electrolytic cell, the two being in electrical connection through a continuous conductor $h$, passing through the air-gap $d$, but insulated from the magnet-casting. The one set of electrodes in each cell may conveniently be concentric cylinders $i\ i'$ of material suitable for the purpose having regard to the electrolyte and to whether these electrodes are anodes or cathodes. When the vessels are made of or lined with a conductor, the cylinders $i\ i'$ are best set in the bottom of the cell so as to partition it into a number of chambers. Into each such chamber there extends a like concentric cylinder $k\ k'$, depending from the armature $a$ and in electrical connection therewith. These cylinders constitute the other set of electrodes in each cell and are of material suited for that purpose.

When the armature $a$ is rotated, current is generated in it and flows, according to the direction of rotation and to the direction of the current in the magnet-coils, either from the armature through cylinders $k'$, which thus become anodes; through the electrolyte in $f$ to the cylinders $i'$, which thus become cathodes; through conductor $h$ to cylinders $i$, which thus become anodes; through the electrolyte in $g$ to cylinders $k$, which thus become cathodes, and thence back to the armature, or the reverse.

To illustrate better the operation of the apparatus, I will describe its application to the manufacture of caustic soda and chlorin by electrolysis of brine.

The brine is admitted by pipe $l$ into the innermost compartment of the cell $g$, whence it circulates through each compartment, as indicated by the arrows, finally passing away to be resaturated, if desired, through outlet $m$. The inner surface of each depending cylinder $k$ has two horizontal flanges—a lower one $n$ and a somewhat deeper upper one $n'$. Onto each lower flange $n$ mercury is allowed to flow through a pipe $o$ from a reservoir $p$. The centrifugal action causes this mercury to rise up the surface of the cylinder and over the upper flange, the object of which is to insure a certain depth of this layer of mercury. Arrived above the upper flange the mercury finds exit through pipes $q$, Fig. 2, which pass through the air-gap $d$ and deliver the mercury below an upper horizontal flange $r$ on the inner surface of one of the cylinders $k'$, the pipes $q$ being distributed at approximately equal angles to each other leading the several electrodes $k'$. The mercury flows down this surface and over a lower flange $r'$, somewhat shallower than the upper one. Finally the mercury flows by pipe $s$ to pump $t$, which raises it again to reservoir $p$.

It may not be necessary to provide two horizontal flanges on each cylinder, the lower one sufficing.

Some provision is necessary to prevent passage of electrolyte through the pipes $q$ when they happen to be empty or partly empty of mercury. As shown in Fig. 2, the pipes are curved at their delivery ends, so that sufficient mercury is always retained to form a seal.

Vertical or inclined ribs $z$ are fixed to the inner side of the stationary electrodes to partly arrest the rotation of the electrolyte.

The direction of rotation of the armature being such that cylinders $k$ are cathodes and water being admitted through pipe $f'$ into the outer cell $f$, whence it escapes by pipe $f^2$, the electrolysis is as follows: The sodium chlorid in cell $g$ is decomposed, the sodium being deposited upon and dissolved in the mercury rising up the cathode-surfaces, while chlorin is liberated at the anodes—in this case the stationary cylinders $i$. The chlorin passes from compartment to compartment through short pipes $u$ and is finally drawn off by suitable suction through a pipe $v$, opening above a bell $w$, which closes the inner cell and is sealed by an oil-joint $x$. The mercury containing sodium is delivered in the manner described onto the rotating cylinders $k'$, which in this case are anodes. The sodium is here converted into caustic soda, an equivalent of hydrogen being evolved at the cathodes $i$ and escaping through openings $y$ into the outer air.

Having thus described the nature of this invention and the best means I know of carrying same into practical effect, I claim—

1. An apparatus of the class described, comprising two sets of nested electrodes spaced from each other, and an electrical conductor transmitting motion to one set of the electrodes.

2. An apparatus of the class described, comprising an electrical conductor, electrodes carried thereby, and magnetic poles spacing the electrodes into sets and between which the conductor revolves.

3. An apparatus of the class described, comprising a circular electrical conductor, electrodes arranged concentrically thereon, and magnetic poles spacing the electrodes and between which the said conductor revolves.

4. An apparatus of the class described, comprising a circular electrical conductor, two sets of concentrically-disposed electrodes arranged thereon and in electrical connection therewith, magnetic poles arranged between the sets, and two other sets of electrodes disposed concentrically with the first-named sets and electrically connected with each other.

5. Apparatus for the generation and application of electric currents for electrolysis comprising a disk of electrically-conducting material rotated in a horizontal plane, a closed annular box which is a magnet, an air-gap in the inner wall of said box through which air-gap the said disk extends, concentric cylinders of electrode material depending from the said disk in two sets, one set on each side of the air-gap, fixed concentric cylinders of electrode material also in two sets, one set on each side of the said air-gap and contained in a separate vessel, there being a depending cylinder between each fixed cylinder and the next, and electrical connection between the two vessels, substantially as described.

6. Apparatus for the generation and application of electric currents for electrolysis comprising a disk of electrically-conducting material rotated in a horizontal plane, a closed annular box which is a magnet, an air-gap in the inner wall of said box through which air-gap the said disk extends, concentric cylinders of electrode material depending from the said disk in two sets, one set on each side of the air-gap, fixed concentric cylinders of electrode material also in two sets one set on each side of the said air-gap and contained in a separate vessel, there being a depending cylinder between each fixed cylinder and the next, and an electrical conductor passing through the said air-gap to electrically connect the electrodes in the one vessel with those in the other, substantially as described.

7. Apparatus for the generation and application of electric currents for electrolysis comprising a disk of electrically-conducting material rotated in a horizontal plane, a closed annular box which is a magnet, an air-gap in the inner wall of said box through which air-gap the said disk extends, concentric cylinders of electrode material depending from the said disk in two sets, one set on each side of the air-gap, fixed concentric cylinders of electrode material also in two sets one set on each side of the said air-gap and contained in a separate vessel there being a depending cylinder between each fixed cylinder and the next, one or more horizontal flanges on the inner surface of each depending cylinder, a pipe passing from each depending cylinder of the inner set to a depending cylinder of the outer set, and mercury flowing by centrifugal action up each depending cylinder of the inner set and by gravity down each depending cylinder of the outer set, substantially as described.

8. An electrolytic apparatus comprising two sets of cylindrical revolving electrodes faced with mercury by centrifugal action, in combination with an arrangement for transmitting the mercury from the one set of revolving electrodes to the other set, substantially as described.

9. In an apparatus of the class described, an electrode having its active face composed of mercury moving under centrifugal action.

In testimony whereof I have hereunto set my hand in presence of two subscribing witnesses.

FRANCIS EDWARD ELMORE.

Witnesses:
THOMAS CLEAVER ANDREWS,
WALTER J. SKERTEN.